United States Patent
Gokhale et al.

(10) Patent No.: US 11,099,943 B2
(45) Date of Patent: *Aug. 24, 2021

(54) INDEXING BACKUP DATA GENERATED IN BACKUP OPERATIONS

(71) Applicant: Commvault Systems, Inc., Tinton Falls, NJ (US)

(72) Inventors: Parag Gokhale, Marlboro, NJ (US); Prakash Varadharajan, Morganville, NJ (US); Pavlo Mazur, Tinton Falls, NJ (US)

(73) Assignee: Commvault Systems, Inc., Tinton Falls, NJ (US)

( * ) Notice: Subject to any disclaimer, the term of this patent is extended or adjusted under 35 U.S.C. 154(b) by 253 days.

This patent is subject to a terminal disclaimer.

(21) Appl. No.: 16/297,457

(22) Filed: Mar. 8, 2019

(65) Prior Publication Data
US 2019/0205217 A1 Jul. 4, 2019

Related U.S. Application Data

(63) Continuation of application No. 15/684,410, filed on Aug. 23, 2017, now Pat. No. 10,534,673, which is a (Continued)

(51) Int. Cl.
*G06F 11/00* (2006.01)
*G06F 16/00* (2019.01)
(Continued)

(52) U.S. Cl.
CPC ...... *G06F 11/1464* (2013.01); *G06F 11/1446* (2013.01); *G06F 11/1451* (2013.01);
(Continued)

(58) Field of Classification Search
CPC .......... G06F 16/21; G06F 16/10; G06F 16/13; G06F 16/113; G06F 16/2246;
(Continued)

(56) References Cited

U.S. PATENT DOCUMENTS 4,084,231 A 4/1978 Capozzi et al.
4,267,568 A 5/1981 Dechant et al.
(Continued)

FOREIGN PATENT DOCUMENTS

AU 2004227949 10/2004
CA 2498174 3/2004
(Continued)

OTHER PUBLICATIONS

Ge Fu, Hong Zhu et al., "Fine Grained Transaction Log for Data Recovery in Database Systems", Third Asia-Pacific Trusted Infrastructure Technologies Conference, IEEE 2008, pp. 123-131.*
(Continued)

*Primary Examiner* — Srirama Channavajjala
(74) *Attorney, Agent, or Firm* — Commvault Systems, Inc.

(57) ABSTRACT

In certain embodiments, a tiered storage system is disclosed that provides for failover protection during data backup operations. The system can provide for an index, or catalog, for identifying and enabling restoration of backup data located on a storage device. The system further maintains a set of transaction logs generated by media agent modules that identify metadata with respect to individual data chunks of a backup file on the storage device. A copy of the catalog and transaction logs can be stored at a location accessible by each of the media agent modules. In this manner, in case of a failure of one media agent module during backup, the transaction logs and existing catalog can be used by a second media agent module to resume the backup operation without requiring a restart of the backup process.

20 Claims, 3 Drawing Sheets

Related U.S. Application Data continuation of application No. 14/675,524, filed on Mar. 31, 2015, now abandoned, which is a continuation of application No. 13/958,353, filed on Aug. 2, 2013, now Pat. No. 9,026,497, which is a continuation of application No. 12/982,165, filed on Dec. 30, 2010, now Pat. No. 8,504,526.

(60) Provisional application No. 61/351,790, filed on Jun. 4, 2010.

(51) Int. Cl.
| | |
|---|---|
| G06F 11/14 | (2006.01) |
| G06F 16/10 | (2019.01) |
| G06F 16/21 | (2019.01) |
| G06F 16/11 | (2019.01) |
| H04L 12/24 | (2006.01) |
| G06F 11/20 | (2006.01) |

(52) U.S. Cl.
CPC ...... *G06F 11/1466* (2013.01); *G06F 11/1471* (2013.01); *G06F 11/2023* (2013.01); *G06F 16/10* (2019.01); *G06F 16/113* (2019.01); *G06F 16/21* (2019.01); *H04L 41/08* (2013.01)

(58) Field of Classification Search
CPC .... G06F 16/2358; G06F 16/316; G06F 16/41; G06F 16/51; G06F 16/22; G06F 16/2379; G06F 11/1464; G06F 11/1446; G06F 11/1471; G06F 11/2023; G06F 11/1469; G06F 11/1451; G06F 11/1448; G06F 11/2097; G06F 11/1466; G06F 11/1458; H04L 41/08

See application file for complete search history.

(56) References Cited

U.S. PATENT DOCUMENTS

| | | |
|---|---|---|
| 4,283,787 A | 8/1981 | Chambers |
| 4,417,321 A | 11/1983 | Chang et al. |
| 4,641,274 A | 2/1987 | Swank |
| 4,654,819 A | 3/1987 | Stiffler et al. |
| 4,686,620 A | 8/1987 | Ng |
| 4,912,637 A | 3/1990 | Sheedy et al. |
| 4,995,035 A | 2/1991 | Cole et al. |
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,301,286 A | 4/1994 | Rajani |
| 5,321,816 A | 6/1994 | Rogan et al. |
| 5,347,653 A | 9/1994 | Flynn et al. |
| 5,410,700 A | 4/1995 | Fecteau et al. |
| 5,420,996 A | 5/1995 | Aoyagi |
| 5,454,099 A | 9/1995 | Myers et al. |
| 5,544,359 A | 8/1996 | Tada et al. |
| 5,548,750 A | 8/1996 | Larsson et al. |
| 5,559,991 A | 9/1996 | Kanfi |
| 5,638,509 A | 6/1997 | Dunphy et al. |
| 5,640,561 A | 6/1997 | Satoh et al. |
| 5,642,496 A | 6/1997 | Kanfi |
| 5,793,867 A * | 8/1998 | Cordery ............... G06Q 20/341 705/404 |
| 6,078,932 A | 6/2000 | Haye et al. |
| 6,175,904 B1 | 1/2001 | Gunderson |
| 6,185,474 B1 | 2/2001 | Nakamura et al. |
| 6,230,166 B1 * | 5/2001 | Velamuri ............... H04Q 3/005 |
| 6,272,631 B1 | 8/2001 | Thomlinson et al. |
| 6,415,323 B1 | 7/2002 | McCanne et al. |
| 6,418,478 B1 | 7/2002 | Ignatius et al. |
| 6,542,972 B2 | 4/2003 | Ignatius et al. |
| 6,658,436 B2 | 12/2003 | Oshinsky et al. |
| 6,704,839 B2 | 3/2004 | Butterworth et al. |
| 6,721,767 B2 | 4/2004 | De Meno et al. |
| 6,732,124 B1 | 5/2004 | Koseki et al. |
| 6,760,723 B2 | 7/2004 | Oshinsky et al. |
| 6,769,003 B2 | 7/2004 | Park et al. |
| 6,795,904 B1 | 9/2004 | Kamvysselis |
| 7,003,641 B2 | 2/2006 | Prahlad et al. |
| 7,035,880 B1 | 4/2006 | Crescenti et al. |
| 7,065,537 B2 | 6/2006 | Cha et al. |
| 7,107,298 B2 | 9/2006 | Prahlad et al. |
| 7,130,970 B2 | 10/2006 | Devassy et al. |
| 7,143,121 B2 | 11/2006 | Mendonca et al. |
| 7,162,496 B2 | 1/2007 | Amarendran et al. |
| 7,174,433 B2 | 2/2007 | Kottomtharayil et al. |
| 7,178,059 B2 | 2/2007 | Greenspan et al. |
| 7,209,972 B1 | 4/2007 | Ignatius et al. |
| 7,234,073 B1 | 6/2007 | Roytman et al. |
| 7,246,207 B2 | 7/2007 | Kottomtharayil et al. |
| 7,249,150 B1 | 7/2007 | Watanabe et al. |
| 7,315,923 B2 | 1/2008 | Retnamma et al. |
| 7,315,924 B2 | 1/2008 | Prahlad et al. |
| 7,318,134 B1 | 1/2008 | Oliveira et al. |
| 7,343,453 B2 | 3/2008 | Prahlad et al. |
| 7,380,072 B2 | 5/2008 | Kottomtharayil et al. |
| 7,383,293 B2 * | 6/2008 | Gupta ............... G06F 11/2074 |
| 7,389,311 B1 | 6/2008 | Crescenti et al. |
| 7,395,282 B1 | 7/2008 | Crescenti et al. |
| 7,401,154 B2 | 7/2008 | Ignatiusl et al. |
| 7,409,509 B2 | 8/2008 | Devassy et al. |
| 7,424,519 B2 | 9/2008 | Hoshino et al. |
| 7,437,388 B1 | 10/2008 | DeVos |
| 7,440,982 B2 | 10/2008 | Lu et al. |
| 7,447,692 B2 | 11/2008 | Oshinsky et al. |
| 7,454,569 B2 | 11/2008 | Kavuri et al. |
| 7,484,054 B2 | 1/2009 | Kottomtharayil et al. |
| 7,490,207 B2 | 2/2009 | Amarendran |
| 7,500,053 B1 | 3/2009 | Kavuri et al. |
| 7,529,782 B2 | 5/2009 | Prahlad et al. |
| 7,536,291 B1 | 5/2009 | Retnamma et al. |
| 7,543,125 B2 | 6/2009 | Gokhale |
| 7,546,324 B2 | 6/2009 | Prahlad et al. |
| 7,581,077 B2 | 8/2009 | Ignatius et al. |
| 7,594,138 B2 | 9/2009 | Abdulvahid |
| 7,596,721 B1 | 9/2009 | Flake et al. |
| 7,600,125 B1 | 10/2009 | Stringham |
| 7,603,386 B2 | 10/2009 | Amarendran et al. |
| 7,606,844 B2 | 10/2009 | Kottomtharayil |
| 7,613,748 B2 | 11/2009 | Brockway et al. |
| 7,613,752 B2 | 11/2009 | Prahlad et al. |
| 7,617,253 B2 | 11/2009 | Prahlad et al. |
| 7,617,262 B2 | 11/2009 | Prahlad et al. |
| 7,620,710 B2 | 11/2009 | Kottomtharayil et al. |
| 7,636,743 B2 | 12/2009 | Erofeev |
| 7,651,593 B2 | 1/2010 | Prahlad et al. |
| 7,657,550 B2 | 2/2010 | Prahlad et al. |
| 7,660,807 B2 | 2/2010 | Prahlad et al. |
| 7,661,028 B2 | 2/2010 | Erofeev |
| 7,707,184 B1 | 4/2010 | Zhang et al. |
| 7,707,190 B2 * | 4/2010 | Yu ............... G06F 11/1469 707/680 |
| 7,739,459 B2 | 6/2010 | Kottomtharayil et al. |
| 7,747,579 B2 | 6/2010 | Prahlad et al. |
| 7,757,043 B2 | 7/2010 | Kavuri et al. |
| 7,769,961 B2 | 8/2010 | Kottomtharayil et al. |
| 7,797,281 B1 * | 9/2010 | Greene ............... G06F 11/1451 707/647 |
| 7,801,864 B2 | 9/2010 | Prahlad et al. |
| 7,802,067 B2 | 9/2010 | Prahlad et al. |
| 7,809,914 B2 | 10/2010 | Kottomtharayil et al. |
| 7,822,717 B2 * | 10/2010 | Kapoor ............... G06F 11/1471 707/680 |
| 8,051,473 B2 | 11/2011 | Szucs |

(56) References Cited

U.S. PATENT DOCUMENTS

| | | |
|---|---|---|
| 8,108,640 B1 | 1/2012 | Holl, II |
| 8,131,681 B1 | 3/2012 | Hangud et al. |
| 8,156,086 B2 | 4/2012 | Lu et al. |
| 8,170,995 B2 | 5/2012 | Prahlad et al. |
| 8,195,623 B2 | 6/2012 | Prahlad et al. |
| 8,204,859 B2 | 6/2012 | Ngo |
| 8,229,954 B2 | 7/2012 | Kottomtharayil et al. |
| 8,230,195 B2 | 7/2012 | Amarendran et al. |
| 8,271,443 B1 | 9/2012 | Swift et al. |
| 8,285,681 B2 | 10/2012 | Prahlad et al. |
| 8,291,170 B1 | 10/2012 | Zhang et al. |
| 8,291,407 B2 | 10/2012 | Greenwood et al. |
| 8,307,177 B2 | 11/2012 | Prahlad et al. |
| 8,336,040 B2 | 12/2012 | Davidson et al. |
| 8,364,652 B2 | 1/2013 | Vijayan et al. |
| 8,370,542 B2 | 2/2013 | Lu et al. |
| 8,504,526 B2 * | 8/2013 | Gokhale ............... H04L 41/08 707/648 |
| 8,650,389 B1 | 2/2014 | Thornewell et al. |
| 8,793,222 B1 | 7/2014 | Stringham |
| 8,930,496 B2 | 1/2015 | Gokhale et al. |
| 9,020,987 B1 | 4/2015 | Nanda et al. |
| 9,026,497 B2 * | 5/2015 | Gokhale ............. G06F 11/1471 707/648 |
| 9,244,777 B2 | 1/2016 | Boullery et al. |
| 9,483,361 B2 | 11/2016 | Gokhale et al. |
| 9,483,362 B2 | 11/2016 | Gokhale et al. |
| 9,483,363 B2 | 11/2016 | Gokhale et al. |
| 9,483,364 B2 | 11/2016 | Gokhale et al. |
| 9,563,518 B2 | 2/2017 | Klose |
| 9,811,427 B2 | 11/2017 | Klose |
| 9,892,276 B2 * | 2/2018 | Bell .................... G06F 21/6218 |
| 10,001,935 B2 | 6/2018 | Gokhale et al. |
| 10,013,314 B2 | 7/2018 | Klose |
| 10,073,649 B2 | 9/2018 | DeJong et al. |
| 10,146,643 B2 * | 12/2018 | Fang .................. G06F 11/1451 |
| 10,365,839 B2 | 7/2019 | Gokhale et al. |
| 10,534,672 B2 | 1/2020 | Klose |
| 10,534,673 B2 * | 1/2020 | Gokhale ............. G06F 11/1446 |
| 10,628,267 B2 * | 4/2020 | Pradhan ............. G06F 11/1451 |
| 10,673,943 B2 * | 6/2020 | Pradhan ............. H04L 67/1097 |
| 10,838,824 B2 | 11/2020 | Klose |
| 10,884,635 B2 | 1/2021 | Gokhale et al. |
| 2001/0044910 A1 * | 11/2001 | Ricart ............... G06F 11/1458 714/6.12 |
| 2002/0178143 A1 | 11/2002 | Fujimoto |
| 2003/0021223 A1 | 1/2003 | Kashyap |
| 2003/0074600 A1 * | 4/2003 | Tamatsu ............. G06F 11/1458 714/5.11 |
| 2003/0163495 A1 | 8/2003 | Lanzatella et al. |
| 2003/0182301 A1 | 9/2003 | Patterson et al. |
| 2003/0182329 A1 | 9/2003 | Sato |
| 2003/0236956 A1 | 12/2003 | Grubbs et al. |
| 2004/0019892 A1 | 1/2004 | E et al. |
| 2004/0044642 A1 * | 3/2004 | Fujii .................. G06F 16/2358 |
| 2004/0078654 A1 | 4/2004 | Holland et al. |
| 2004/0139127 A1 | 7/2004 | Pofelski |
| 2004/0153823 A1 | 8/2004 | Ansari |
| 2004/0250033 A1 | 12/2004 | Prahlad et al. |
| 2004/0267838 A1 | 12/2004 | Curran et al. |
| 2004/0268175 A1 | 12/2004 | Koch et al. |
| 2005/0039069 A1 | 2/2005 | Prahlad et al. |
| 2005/0044114 A1 | 2/2005 | Kottomtharayil et al. |
| 2005/0131996 A1 | 6/2005 | Mastrianni et al. |
| 2005/0138461 A1 | 6/2005 | Allen et al. |
| 2005/0183072 A1 | 8/2005 | Horning et al. |
| 2005/0187891 A1 | 8/2005 | Johnson et al. |
| 2005/0216788 A1 | 9/2005 | Mani-Meitav et al. |
| 2005/0235286 A1 | 10/2005 | Ballew et al. |
| 2005/0262033 A1 * | 11/2005 | Yamashita ........... G06F 11/1435 |
| 2005/0262316 A1 | 11/2005 | Obayashi et al. |
| 2005/0268156 A1 | 12/2005 | Mashayekhi et al. |
| 2005/0278397 A1 | 12/2005 | Clark |
| 2006/0026452 A1 | 2/2006 | Suzuki et al. |
| 2006/0047626 A1 * | 3/2006 | Raheem ............. G06F 11/1469 |
| 2006/0085672 A1 | 4/2006 | Watanabe et al. |
| 2006/0155594 A1 | 7/2006 | Almeida et al. |
| 2006/0206547 A1 | 9/2006 | Kulkarni et al. |
| 2006/0224846 A1 | 10/2006 | Amarendran et al. |
| 2006/0236054 A1 | 10/2006 | Kitamura et al. |
| 2007/0074068 A1 | 3/2007 | Hsieh |
| 2007/0094467 A1 | 4/2007 | Yamasaki |
| 2007/0094533 A1 | 4/2007 | Coombs et al. |
| 2007/0150499 A1 * | 6/2007 | D'Souza ............. G06F 11/2041 |
| 2007/0156793 A1 | 7/2007 | D'Souza et al. |
| 2007/0185922 A1 * | 8/2007 | Kapoor ............... G06F 11/1471 |
| 2007/0185938 A1 | 8/2007 | Prahlad et al. |
| 2007/0186068 A1 | 8/2007 | Agrawal |
| 2007/0226535 A1 | 9/2007 | Gokhale |
| 2007/0234108 A1 | 10/2007 | Cox et al. |
| 2007/0250365 A1 | 10/2007 | Chakrabarti et al. |
| 2007/0271471 A1 | 11/2007 | Merzlikine et al. |
| 2007/0282921 A1 | 12/2007 | Atluri et al. |
| 2007/0283355 A1 | 12/2007 | Misono et al. |
| 2007/0299930 A1 | 12/2007 | Wendelrup et al. |
| 2008/0022058 A1 | 1/2008 | Nadathur et al. |
| 2008/0059704 A1 | 3/2008 | Kavuri |
| 2008/0098049 A1 | 4/2008 | Pillai et al. |
| 2008/0147754 A1 | 6/2008 | Littlefield et al. |
| 2008/0162840 A1 * | 7/2008 | Augenstein ......... G06F 11/1471 711/161 |
| 2008/0201600 A1 | 8/2008 | Lu |
| 2008/0228833 A1 | 9/2008 | Kano |
| 2008/0244204 A1 | 10/2008 | Cremelie et al. |
| 2008/0253283 A1 | 10/2008 | Douglis et al. |
| 2008/0270488 A1 | 10/2008 | Ozawa et al. |
| 2008/0307020 A1 | 12/2008 | Ko et al. |
| 2009/0037763 A1 | 2/2009 | Adhya et al. |
| 2009/0055507 A1 | 2/2009 | Oeda |
| 2009/0077557 A1 | 3/2009 | Ichikawa et al. |
| 2009/0183145 A1 | 7/2009 | Hu et al. |
| 2009/0319534 A1 | 12/2009 | Gokhale |
| 2010/0017444 A1 | 1/2010 | Chatterjee et al. |
| 2010/0082672 A1 | 4/2010 | Kottomtharayil |
| 2010/0094981 A1 | 4/2010 | Cordray |
| 2010/0101300 A1 | 4/2010 | Rigby et al. |
| 2010/0162037 A1 | 6/2010 | Maule et al. |
| 2010/0281458 A1 | 11/2010 | Paladino et al. |
| 2010/0293439 A1 | 11/2010 | Flynn et al. |
| 2010/0299490 A1 | 11/2010 | Attarde et al. |
| 2010/0332456 A1 | 12/2010 | Prahlad et al. |
| 2011/0154109 A1 | 6/2011 | Levine |
| 2011/0218967 A1 | 9/2011 | Sliger et al. |
| 2011/0234583 A1 | 9/2011 | Bakalash |
| 2012/0101999 A1 | 4/2012 | Scherzinger et al. |
| 2012/0150818 A1 | 6/2012 | Vijayan Retnamma et al. |
| 2012/0150826 A1 | 6/2012 | Vijayan Retnamma et al. |
| 2012/0150949 A1 | 6/2012 | Vijayan Retnamma et al. |
| 2013/0238562 A1 | 9/2013 | Kumarasamy et al. |
| 2014/0082128 A1 | 3/2014 | Beard |
| 2014/0101300 A1 | 4/2014 | Rosensweig et al. |
| 2014/0143636 A1 | 5/2014 | Frost et al. |
| 2015/0067391 A1 | 3/2015 | Merchant et al. |
| 2015/0205682 A1 | 7/2015 | Gokhale et al. |
| 2015/0268876 A1 | 9/2015 | Ahn et al. |
| 2015/0350027 A1 | 12/2015 | Raissinia et al. |
| 2015/0370668 A1 | 12/2015 | Nazari et al. |
| 2016/0210064 A1 | 7/2016 | Dornemann et al. |
| 2016/0226966 A1 | 8/2016 | Lin |
| 2017/0265648 A1 | 8/2017 | Klose |
| 2018/0074914 A1 | 3/2018 | Gokhale et al. |
| 2018/0285209 A1 | 10/2018 | Liu et al. |
| 2018/0373597 A1 | 12/2018 | Rana |
| 2018/0373601 A1 | 12/2018 | Klose |
| 2019/0026035 A1 | 1/2019 | Gokhale et al. |
| 2019/0196916 A1 | 6/2019 | Kumarasamy et al. |
| 2019/0205216 A1 | 7/2019 | Gokhale et al. |
| 2019/0258411 A1 | 8/2019 | Gokhale et al. |
| 2019/0278662 A1 | 9/2019 | Nagrale et al. |
| 2019/0370107 A1 | 12/2019 | Subburasu et al. |
| 2020/0159627 A1 | 5/2020 | Bedadala et al. |

(56) References Cited

U.S. PATENT DOCUMENTS

2020/0183802 A1     6/2020    Rathi et al.
2021/0026741 A1     1/2021    Klose

FOREIGN PATENT DOCUMENTS

| | | |
|---|---|---|
| DE | 69415115 | 8/1999 |
| DE | 60020978 | 4/2006 |
| EP | 0259912 | 3/1988 |
| EP | 0405926 | 1/1991 |
| EP | 0467546 | 1/1992 |
| EP | 0541281 | 5/1993 |
| EP | 0645709 | 3/1995 |
| EP | 0774715 | 5/1997 |
| EP | 0809184 | 11/1997 |
| EP | 0899662 | 3/1999 |
| EP | 0981090 | 2/2000 |
| EP | 1204922 | 5/2002 |
| EP | 1209569 A1 | 5/2002 |
| EP | 1384135 | 1/2004 |
| EP | 1387269 A1 | 2/2004 |
| EP | 1393181 | 3/2004 |
| EP | 1 533 701 A1 * | 5/2005 |
| EP | 1533701 | 5/2005 |
| EP | 1938192 B1 | 11/2009 |
| GB | 2447361 | 9/2008 |
| JP | 4198050 | 12/2008 |
| JP | 4267443 | 5/2009 |
| WO | WO 1995/013580 | 5/1995 |
| WO | WO 1999/012098 | 3/1999 |
| WO | WO 2004/023317 | 3/2004 |
| WO | WO 2005/050449 A1 | 6/2005 |
| WO | WO2005103955 A1 * | 11/2005 |
| WO | WO 2006/052872 | 5/2006 |
| WO | WO2007021678 A2 * | 2/2007 |
| WO | WO 2010/140264 A1 | 12/2010 |

OTHER PUBLICATIONS

Arneson, "Mass Storage Archiving in Network Environments" IEEE, 1998, pp. 45-50.

Cabrera, et al. "ADSM: A Multi-Platform, Scalable, Back-up and Archive Mass Storage System," Digest of Papers, Compcon '95, Proceedings of the 40th IEEE Computer Society International Conference, Mar. 5-9, 1995, pp. 420-427, San Francisco, CA.

Eitel, "Backup and Storage Management in Distributed Heterogeneous Environments," IEEE, 1994, pp. 124-126.

Eliezer et al., "Log-Driven Backups: A Recovery Scheme for Large Memory Database Systems", IEEE 1990, pp. 99-109.

IBM Technical Disclosure Bulletin, vol. 24, No. 5, Oct. 1981 New York, US, pp. 2404-2406, K.L. Huff, "Data Set Usage Sequence Number".

Rosenblum et al., "The Design and Implementation of a Log-Structure File System," Operating Systems Review SIGOPS, vol. 25, No. 5, New York, US, pp. 1-15 (May 1991).

Bhagwat et al., "Extreme Binning: Scalable, Parallel Deduplication for Chunk-based File Backup", IEEE International Symposium on Modeling, Analysis & Simulation of Computer and Telecommunication Systems, Sep. 2009, pp. 1-9.

Li et al., "Research on the Backup Mechanism of Oracle Database" International Conference on Environmental Science and Information Application Technology, Jul. 2009, pp. 423-426.

* cited by examiner

INDEXING BACKUP DATA GENERATED IN BACKUP OPERATIONS

CROSS-REFERENCE TO RELATED APPLICATIONS

Any and all applications for which a foreign or domestic priority claim is identified in the Application Data Sheet, or any correction thereto, are hereby incorporated by reference under 37 CFR 1.57. The present application is continuation of U.S. patent application Ser. No. 15/684,410 filed Aug. 23, 2017, which is a continuation of U.S. patent application Ser. No. 14/675,524 filed Mar. 31, 2015, which is a continuation of U.S. patent application Ser. No. 13/958,353 filed Aug. 2, 2013, which is a continuation of U.S. patent application Ser. No. 12/982,165 filed Dec. 30, 2010, which claims the benefit of priority under 35 U.S.C. § 119(e) of U.S. Provisional Patent Application No. 61/351,790, filed on Jun. 4, 2010, and entitled "FAILOVER SYSTEMS AND METHODS FOR PERFORMING BACKUP OPERATIONS," each of which is hereby incorporated herein by reference in its entirety.

BACKGROUND

Field

The present disclosure relates to performing storage backup operations and, in particular, to systems and methods for providing failover during backup operations.

Description of the Related Art

Computers have become an integral part of business operations such that many banks, insurance companies, brokerage firms, financial service providers, and a variety of other businesses rely on computer networks to store, manipulate, and display information that is constantly subject to change. Oftentimes, the success or failure of an important transaction may turn on the availability of information that is both accurate and current. Accordingly, businesses worldwide recognize the commercial value of their data and seek reliable, cost-effective ways to protect the information stored on their computer networks.

To protect this stored data, network administrators can create backup copies of the stored information so that if the original data is destroyed or corrupted, the backup copy can be restored and used in place of the original data. For instance, the module storage architecture of the GALAXY backup system offered by CommVault Systems, Inc. (Oceanport, N.J.) advantageously provides for a multi-tiered storage management solution for backing up data. One drawback, however, with this and other conventional backup systems is that an interruption of the backup process can require the entire process to be restarted, thereby resulting in a loss of valuable time and resources, especially for large backup operations.

SUMMARY

In view of the foregoing, a need exists for improved systems and methods for performing backup operations. For example, there is a need for failover systems and methods for backing up data in a storage environment. In yet other embodiments, a need exists for load balancing between modules tasked with performing the backup operations and indexing the data such that when one module fails or is overloaded, another module can continue the process in place of the failed module.

In certain embodiments of the invention, a tiered storage system is disclosed that provides for failover protection during data backup operations. In certain embodiments, the system provides for an index, or catalog, for identifying and enabling restoration of backup data located on a storage device. The system further maintains a set of transaction logs generated by media agent modules that identify metadata with respect to individual data chunks of a backup file on the storage device. A copy of the catalog and transaction logs can be stored at a location accessible by each of the media agent modules. In this manner, in case of a failure of one media agent module during backup, the transaction logs and existing catalog can be used by a second media agent module to resume the backup operation without requiring a restart of the backup process.

In certain embodiments, a method is disclosed for performing a backup operation in a storage system. The method comprises: receiving with a first media agent module executing on a first computing device a plurality of data chunks to backed up on a storage device as a single backup file; storing a first data chunk of the plurality of data chunks in a backup format on the first storage device; generating a first transaction log comprising metadata of the first data chunk; transmitting the first transaction log to a second computing device; storing a second data chunk of the plurality of data chunks in the backup format on the first storage device; generating a second transaction log comprising metadata of the second data chunk; and transmitting the second transaction log to the second computing device, wherein said transmitting the first and second transaction logs is performed prior to the entire backup file being stored on the storage device.

In certain embodiments, a storage system is disclosed for performing backup operations in a network environment. The storage system includes a storage device, a first media agent module and an index. The storage device is configured to store backup data. The first media agent module executes on a first computing device and is communicatively coupled to the storage device. The first media agent module is also configured to direct first backup operations on the storage device. Then index is maintained on a second computing device and is indicative of at least locations of contents of the backup data stored on the storage device. Moreover, the first media agent is configured to: add data chunks to the backup data, the data chunks being part of a backup file to be stored on the storage device; for data each chunk added to the backup data on the storage device, generate a transaction log associated with the data chunk and comprising data for restoring one or more objects from the data chunk, and transmit the transaction logs to the second computing device prior to the entire backup file being stored on the storage device.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

DETAILED DESCRIPTION OF THE PREFERRED EMBODIMENTS

As will be seen from the disclosure herein, certain embodiments of systems and methods are provided for enabling failover during a backup operation. In particular, embodiments of the invention include creating a catalog, or index, of individual objects or files within backup data on a storage device. Inventive systems can also include media agent modules, or other backup components, that further generate a set of transaction logs that identify metadata with respect to new data objects being stored to the backup data. A copy of the catalog and transaction logs can be stored at a location accessible by multiple media agent modules. As a result, if one media agent fails during a backup operation, a second media agent can access the transaction logs and the existing catalog to resume the backup operation without requiring a restart of the backup process. Such embodiments can also provide means for enabling load balancing or like rotation of media agent modules in completing a common backup operation.

The features of the systems and methods will now be described with reference to the drawings summarized above. Throughout the drawings, reference numbers are re-used to indicate correspondence between referenced elements. The drawings, associated descriptions, and specific implementation are provided to illustrate embodiments of the invention and not to limit the scope of the disclosure.

In addition, methods and functions described herein are not limited to any particular sequence, and the acts or blocks relating thereto can be performed in other sequences that are appropriate. For example, described acts or blocks may be performed in an order other than that specifically disclosed, or multiple acts or blocks may be combined in a single act or block.

Figure 1:
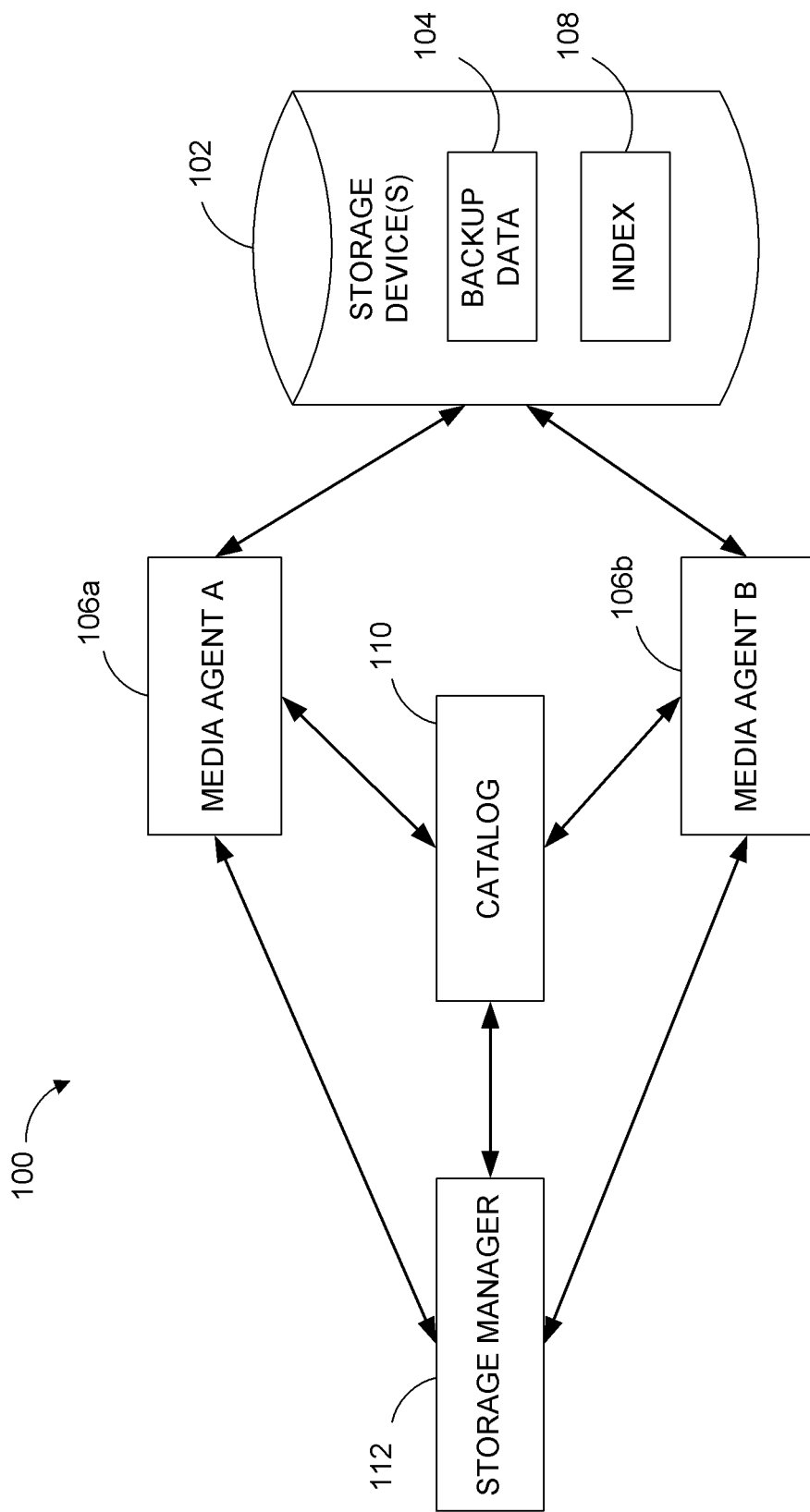
FIG. 1 illustrates a block diagram of a backup system according to certain embodiments of the invention.

FIG. 1 illustrates a block diagram of a backup system 100, according to certain embodiments of the invention. In general, the backup system 100 comprises a modular (or tiered) architecture that provides for failover during a backup operation. For example, the backup system 100 can maintain a central catalog, or index, and one or more transaction logs usable to identify and/or restore backup data on a storage device.

As shown, the backup system 100 comprises at least one storage device 102 for storing backup data 104. The storage device 102 may include any type of media capable of storing electronic data, such as, for example, magnetic storage (such as a disk or a tape drive), optical media, or other type of mass storage. In certain embodiments, the storage device 102 can be part of a storage area network (SAN), a Network Attached Storage (NAS), a virtual machine disk, combinations of the same or the like.

In certain embodiments, the storage device(s) 102 may be implemented as one or more storage "volumes" that include physical storage disks defining an overall logical arrangement of storage space. For instance, disks within a particular volume may be organized as one or more groups of redundant arrays of independent (or inexpensive) disks (RAID).

In certain embodiments, the storage device(s) 102 may include multiple storage devices of the same or different media.

Storage of the backup data 104 to the storage device 102 is performed by media agent modules or devices 106a and 106b (collectively referred to by reference numeral "106"). In general, the media agent devices 106 comprise storage controller computers that serve as intermediary devices and/or means for managing the flow of data from, for example, client information stores to individual storage devices. For instance, the media agent 106 can comprise a module that conducts data between one or more source devices, such as a client computing device, and the storage device(s) 102.

In certain embodiments, the media agents 106 store the backup data 104 on the storage device 102 as a plurality of data chunks. The terms "chunk" and "data chunk" as used herein are broad terms and are used in their ordinary sense and include, without limitation, a portion of data having a payload and encapsulated with metadata describing the contents of the payload placed in a tag header of the chunk. In certain embodiments, a chunk represents the smallest restorable component (e.g., 512 megabytes) of an archive or backup file.

In certain embodiments, the media agent 106 is communicatively coupled with and controls the storage device 102. For example, the media agent 106 may instruct the storage device 102 to use a robotic arm or other means to load or eject a media cartridge, and/or to archive, migrate, or restore application-specific data. In certain embodiments, the media agent 106 communicates with the storage device 102 via a local bus, such as a Small Computer System Interface (SCSI) adaptor. In some embodiments, the storage device 102 is communicatively coupled to the media agent 106 via a SAN.

Each media agent 106 can further maintain an index cache that stores index data generated during backup, migration, and restore operations as further described herein. Such index data provides the backup system 100 with an efficient and intelligent mechanism for locating backed up objects and/or files during restore or recovery operations. For example, the index data can include metadata such as file/object name(s), size, location, offset, checksum and the like of backup data 104 stored on the storage device 102.

Once a backup operation is complete, the index data is generally stored as an index 108 with the data backed up to the storage device 102. This advantageously facilitates access to the files and/or objects within the backup data when performing a restore operation. However, with conventional backup systems, in the event that there is a failure during backup of the data 104, a complete and accurate representation of the backed up data is not stored on the storage device 102. Thus, such failures oftentimes result in a restarting of the backup process and a re-creation of the index data.

To provide for failover during backup operations, the media agents 106 of the backup system 100 are further configured to generate one or more transaction logs for each data chunk backed up to the storage device 102. Such transaction logs can maintain similar information as entries of the index 108 (e.g., object name, size offset, length, checksum, time stamp, combinations of the same or the like). Once a particular data chunk is committed to, or stored on, the storage device 102, the corresponding transaction log(s) are uploaded or transmitted on-the-fly to a main index, or catalog, 110.

The catalog 110, in certain embodiments, represents a copy of the most recent index 108 stored with the backup data 104 on the storage device 102. Like the index 108, the catalog 110 entries contain sufficient information to restore one or more files or blocks from the last completed backup operation. When used in combination with uploaded transaction logs, the catalog 110 can be advantageously used to resume a backup operation that terminates prematurely or otherwise interrupted, such as from a failure of a media agent 106.

The catalog 110 is advantageously accessible to each of the media agents 106 such that if a first media agent (e.g., media agent 106a) fails while performing a backup operation, a second media agent (e.g., media agent 106b) can access the catalog 110 and resume the backup operation in place of the first media agent. For instance, in certain embodiments, the catalog 110 can be stored on a server or other computing device separate from the media agents 106. In yet other embodiments, the catalog 110 can be maintained by a storage manager 112. It will also be appreciated that catalog 110 can represent a computing device, such as a server computer, that maintains the catalog or index.

In certain embodiments, the storage manager 112 comprises a module or application that coordinates and controls storage, migration, recovery and/or restore operations within the backup system 100. For instance, such operations can be based on one or more storage policies, schedules, user preferences or the like. As shown, the storage manager 112 can communicate with each of the media agents 106 and the catalog 110. In yet further embodiments, the storage manager 112 can communicate with the storage device(s) 102.

Although the backup system 100 is shown and described with respect to particular arrangements, it will be understood from the disclosure herein that other embodiments of the invention can take on different configurations. For instance, the backup system 100 can comprise a plurality of media agent modules or devices that each communicate with one or more storage devices and/or one or more client devices.

Furthermore, components of the backup system 100 can also communicate with each other via a computer network. For example, the network may comprise a public network such as the Internet, virtual private network (VPN), token ring or TCP/IP based network, wide area network (WAN), local area network (LAN), an intranet network, point-to-point link, a wireless network, cellular network, wireless data transmission system, two-way cable system, interactive kiosk network, satellite network, broadband network, baseband network, combinations of the same or the like.

Figure 2:
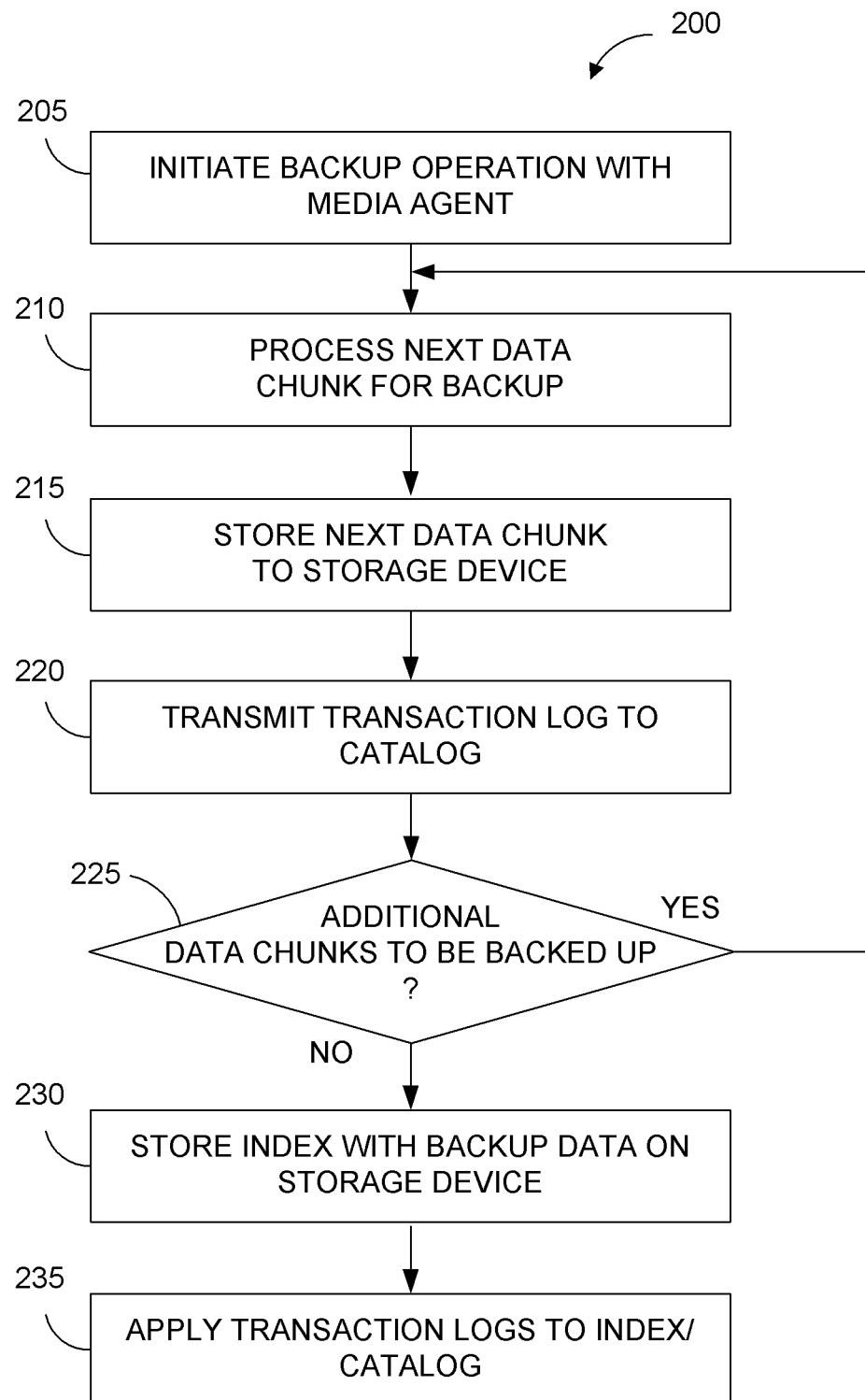
FIG. 2 illustrates a flow chart of an exemplary embodiment of a catalog creation process usable by the backup system of FIG. 1.

FIG. 2 illustrates a flow chart of a catalog creation process 200 according to certain embodiments of the invention. For instance, the process 200 can be advantageously used to maintain a catalog or main index of metadata usable to restore backed up data and resume a backup operation following a premature failure of a backup component. For exemplary purposes, the process 200 will be described with reference to the components of the backup system 100 of FIG. 1.

At Block 205, the process 200 begins a backup operation performed by a media agent device 106. For example, the storage manager 112 may instruct the media agent device 106 to backup data relating to one or more applications executing on one or more client computing devices. As discussed, in certain embodiments, the media agent 106a stores the backup data 104 on the storage device 102 in a chunk-by-chunk manner.

In certain embodiments, the media agent device 106 receives the data to be backed up from one or more data agents operating on a client device. In certain examples, the data can comprise application-specific data or can include data streams with multiple data types or objects contained therein.

At Block 210, the media agent device 106 processes a data chunk of the received data to be backed up. In certain embodiments, such processing includes generating metadata indicative of the contents and/or attributes of the objects within the data chunk or of the data chunk itself, as well as information regarding the storage location of such objects or files on the storage device 102 (e.g., with the backup data 104).

The media agent device 106 then backs up the data chunk to the backup file 104 on the storage device 102 (Block 215). The media agent device 106 also uploads one or more transaction logs to the catalog 110 that contain the above-described metadata for the backed up data chunk (Block 220). In certain embodiments, a single transaction log corresponds to a single data chunk.

At Block 225, the process 200 determines if there are additional data chunks as part of the backup operation. If so, the process 200 returns to Block 210 to process the next data chunk. If not, the process 200 proceeds with Block 230 to store the index 108 with the backup data 104. In certain embodiments, the index 108 allows for restoring individual objects and/or files from the backup data 104. The process 200 also includes applying the uploaded transaction logs to the catalog 110 so that the catalog 110 contains up-to-date information reflecting the contents of the entire backup file 104 (Block 235).

It will be appreciated that the process 200 is not limited to the arrangement of blocks illustrated in FIG. 2. For example, in other embodiments, the transaction log(s) may be uploaded (Block 220) prior to, or concurrent with, the storage of the corresponding data chunks on the storage device 102.

Figure 3:
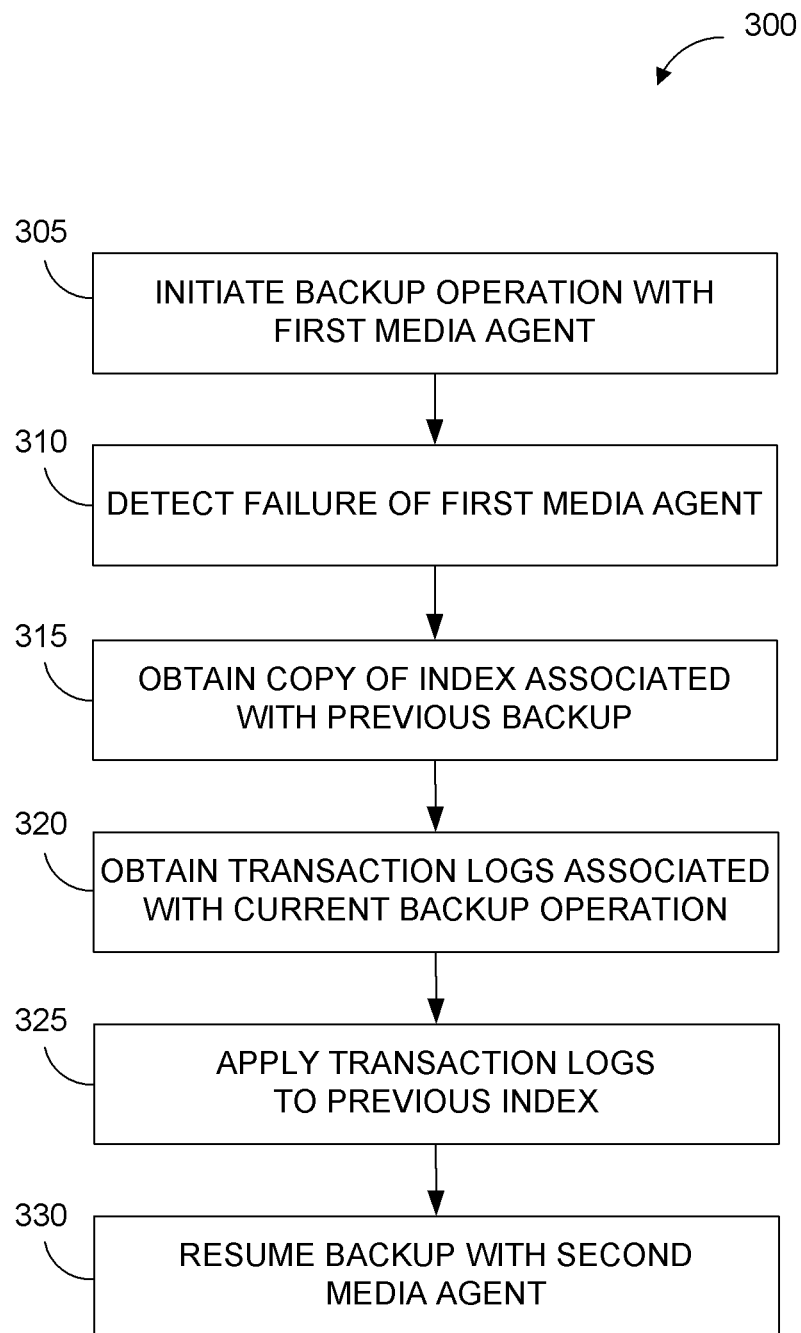
FIG. 3 illustrates a flow chart of an exemplary embodiment of a failover backup process usable by the backup system of FIG. 1.

FIG. 3 illustrates a flow chart of a failover backup process 300 according to certain embodiments of the invention. For instance, the process 300 can be used to transfer control of a backup operation from a first storage controller component to a second storage controller component, such as during a failure or for load balancing. In certain embodiments, the process 300 illustrates a failover method that is possible in a system utilizing the catalog creation process 200 of FIG. 2. For exemplary purposes, the process 300 will be described hereinafter with reference to the components of the backup system 100 of FIG. 1.

The process 300 begins at Block 305 by initiating a backup operation with the first media agent 106a. At Block 310, the process 300 detects a failure of the first media agent 106a. For instance, in certain embodiments, the storage manager 112 can detect that the first media agent 106a has prematurely ceased performing the backup operation. In one embodiment, the failure of the first media agent 112 causes the backup operation to fail, and during the next system restart, the storage manager 112 detects the failure of the first media agent 106a.

Upon detecting failure of the first media agent 106a, the process 300 obtains a copy of the index associated with the last complete backup (Block 315). For example, the storage manager 112 can instruct the second media agent 106b to retrieve a copy of the index 108 from the storage device 102, the catalog 110 (or a computing device maintaining the catalog 110) or the like. In certain embodiments, the retrieved index contains information for retrieving objects and/or files that were stored on the storage device 102 prior to the commencement of the current backup operation (e.g., the most recently completed full backup).

At Block 320, the second media agent 106b also retrieves a copy of the transaction log(s) associated with the interrupted backup operation by the first media agent 106a. In certain embodiments, the transaction logs are stored on the catalog server 110 as a result of Block 220 of the process 200. For instance, the storage manager 112 may instruct that the transaction logs be sent to the second media agent 106b along with instructions to the second media agent 106b to take over the interrupted backup operation.

At Block 325, the second media agent 106b applies the transaction logs to the retrieved index to the point that reflects where in the backup process the first media agent 106a failed. The second media agent 106b is then able to resume the backup operation without needing to repeat the backup of data that was performed by the first media agent 106a (Block 330). For instance, the second media agent 106b can continue backing up the data according to the process 200 depicted in FIG. 2.

Although the process 300 has been described with respect to detecting a failure of a media agent device, other embodiments of the invention can utilize similar steps to achieve load balancing or other selective use of multiple media agents during a single backup operation. For example, at Block 310, the storage manager 112 or other component can determine if the first media agent 106a is operating under unbalanced and/or excessive load. Such an embodiment allows for the second media agent 106b to take over the backup operation prior to a failure of the first media agent 106a. For instance, the storage manager 112 can monitor bandwidth usage, a jobs queue and/or a schedule of the first media agent 106a to evaluate its load.

In certain embodiments of the invention, the backup operations disclosed herein can be used to copy data of one or more applications residing on and/or being executed by a computing device. For instance, the applications may comprise software applications that interact with a user to process data and may include, for example, database applications (e.g., SQL applications), word processors, spreadsheets, financial applications, management applications, e-commerce applications, browsers, combinations of the same or the like. For example, in certain embodiments, the applications may comprise one or more of the following: MICROSOFT EXCHANGE, MICROSOFT SHAREPOINT, MICROSOFT SQL SERVER, ORACLE, MICROSOFT WORD and LOTUS NOTES.

Moreover, in certain embodiments of the invention, data backup systems and methods may be used in a modular storage management system, embodiments of which are described in more detail in U.S. Pat. No. 7,035,880, issued Apr. 5, 2006, and U.S. Pat. No. 6,542,972, issued Jan. 30, 2001, each of which is hereby incorporated herein by reference in its entirety. For example, the disclosed backup systems may be part of one or more storage operation cells that includes combinations of hardware and software components directed to performing storage operations on electronic data. Exemplary storage operation cells usable with embodiments of the invention include CommCells as embodied in the QNet storage management system and the QiNetix storage management system by CommVault Systems, Inc., and as further described in U.S. Pat. No. 7,454,569, issued Nov. 18, 2008, which is hereby incorporated herein by reference in its entirety.

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. Software and other modules may be accessible via local memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other interfaces suitable for the purposes described herein.

Embodiments of the invention are also described above with reference to flow chart illustrations and/or block diagrams of methods, apparatus (systems) and computer program products. It will be understood that each block of the flow chart illustrations and/or block diagrams, and combinations of blocks in the flow chart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the acts specified in the flow chart and/or block diagram block or blocks.

These computer program instructions may also be stored in a computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded onto a computer or other programmable data processing apparatus to cause a series of operations to be performed on the computer or other programmable apparatus to produce a computer implemented process such that the instructions which execute on the computer or other programmable apparatus provide steps for implementing the acts specified in the flow chart and/or block diagram block or blocks.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A storage system for generating and indexing backup data, the storage system comprising:
    a first computing device comprising one or more hardware processors and computer memory;
    a second computing device comprising one or more hardware processors and computer memory;
    wherein the first computing device is configured to:
        perform a first backup operation that generates first backup data as data chunks;

store the first backup data on one or more storage devices that are communicatively coupled to the first computing device, wherein the first backup operation further generates a plurality of transaction logs corresponding to and comprising metadata about the data chunks generated in the first backup operation, and after a given data chunk is committed to the one or more storage devices, transmit to an index one or more transaction logs, in the plurality of transaction logs, that correspond to the given data chunk, wherein the index is stored at a third computing device that is distinct from the one or more storage devices, from the first computing device, and from the second computing device; and wherein the second computing device is configured to:
instruct the first computing device to perform the first backup operation; and wherein the third computing device comprises one or more hardware processors and computer memory and is configured to:
receive from the first computing device the plurality of transaction logs,
after the first backup operation completes, apply the plurality of transaction logs to the index, wherein the index is configured to enable restoring backup files generated by at least the first backup operation, including restoring first backup files within the first backup data, and
serve information from the index to the first computing device for identifying respective storage locations of the first backup files within the first backup data at the one or more storage devices.

2. The storage system of claim 1, wherein the second computing device is further configured to, after the plurality of transaction logs are applied to the index, cause a copy of the index to be generated.

3. The storage system of claim 1, wherein the second computing device is further configured to:
instruct the first computing device to restore the first backup files from the first backup data at the one or more storage devices that are communicatively coupled to the first computing device; and wherein the first computing device is further configured to:
use the index (a) to identify respective storage locations of the first backup files at the one or more storage devices that are communicatively coupled to the first computing device, and (b) to restore the first backup files from the one or more storage devices.

4. The storage system of claim 1, wherein the third computing device is further configured to cause a copy of the index to be generated after applying the plurality of transaction logs.

5. The storage system of claim 1, wherein the plurality of transaction logs comprise information for identifying the first backup files within the first backup data at the one or more storage devices that are communicatively coupled to the first computing device.

6. The storage system of claim 1, wherein, as received in the plurality of transaction logs, the index comprises information for identifying the first backup files within the first backup data at the one or more storage devices that are communicatively coupled to the first computing device.

7. The storage system of claim 1, wherein the index receives transaction logs from a plurality of computing devices configured to perform backup operations, including from the first computing device.

8. The storage system of claim 1, wherein a copy of the index is stored to at least one of: (a) the second computing device, and (b) a second storage device associated with the second computing device and distinct from the one or more storage devices that are communicatively coupled to the first computing device.

9. The storage system of claim 1 further comprising
a fourth computing device comprising one or more hardware processors and computer memory; and
wherein the fourth computing device is configured to:
perform a second backup operation that generates second backup data as data chunks and stores the second backup data to one or more storage devices that are communicatively coupled to the fourth computing device,
wherein the second backup operation further generates a second plurality of transaction logs that correspond to and comprise metadata about each of the data chunks generated in the second backup operation, and
transmit the second plurality of transaction logs to the index; and
wherein the third computing device is further configured to:
receive from the fourth computing device the second plurality of transaction logs,
after the second backup operation completes, apply the second plurality of transaction logs to the index, and
serve information from the index to the fourth computing device for identifying respective storage locations of second backup files within the second backup data at the one or more storage devices that are communicatively coupled to the fourth computing device.

10. The storage system of claim 1, wherein the plurality of transaction logs are based on one or more of: (a) generating the first backup data and (b) storing the first backup data to the one or more storage devices that are communicatively coupled to the first computing device.

11. A method for generating and indexing backup data, the method comprising:
by a first computing device comprising one or more hardware processors and computer memory:
performing a first backup operation that generates first backup data as data chunks,
storing the first backup data on one or more storage devices that are communicatively coupled to the first computing device,
wherein the first backup operation further generates a first plurality of transaction logs corresponding to and comprising metadata about the data chunks generated in the first backup operation, and
after a given data chunk is committed to the one or more storage devices, transmitting, to an index at a second computing device, one or more transaction logs, among the first plurality of transaction logs, that correspond to the given data chunk,
wherein the second computing device is distinct from the one or more storage devices, and from the first computing device; and
by the second computing device comprising one or more hardware processors and computer memory:

receiving from the first computing device the first plurality of transaction logs corresponding to the data chunks of the first backup data generated by the first backup operation, after the first backup operation completes, applying the first plurality of transaction logs to the index, wherein the index is configured to enable restoring backup files generated by at least the first backup operation, including restoring first backup files within the first backup data, serving information from the index to the first computing device for identifying respective storage locations at the one or more storage devices of the first backup files within the first backup data, receiving from an other computing device a second plurality of transaction logs corresponding to and comprising metadata about data chunks of second backup data generated in a second backup operation, after the second backup operation completes, applying the second plurality of transaction logs to the index, and serving information from the index to the other computing device for identifying respective storage locations of second backup files within the second backup data at one or more storage devices.

12. The method of claim 11, wherein the first plurality of transaction logs are based on one or more of: (a) generating the first backup data and (b) storing the first backup data to the one or more storage devices that are communicatively coupled to the first computing device.

13. The method of claim 11, further comprising: by the second computing device, after the first plurality of transaction logs are applied to the index, causing a copy of the index to be generated.

14. The method of claim 11, wherein the first computing device receives an instruction to perform the first backup operation from a third computing device, which comprises one or more hardware processors and computer memory.

15. The method of claim 14, further comprising: by the third computing device, after the first plurality of transaction logs are applied to the index, causing a copy of the index to be generated.

16. The method of claim 14, further comprising: storing a copy of the index to at least one of: (a) the third computing device, and (b) a second storage device associated with the third computing device and distinct from the one or more storage devices that are communicatively coupled to the first computing device.

17. The method of claim 11, wherein the first plurality of transaction logs comprise information for identifying the first backup files within the first backup data at the one or more storage devices that are communicatively coupled to the first computing device.

18. The method of claim 11, wherein, as received in the first plurality of transaction logs, the index comprises information for identifying the first backup files within the first backup data at the one or more storage devices that are communicatively coupled to the first computing device.

19. The method of claim 11, wherein the index receives transaction logs from a first plurality of computing devices configured to perform backup operations, including from the first computing device and from the other computing device.

20. The method of claim 11,
wherein the one or more storage devices where the second backup data is stored are the same as the one or more storage devices where the first backup data is stored.

* * * * *